United States Patent [19]
Ditcher

[11] 3,891,224
[45] June 24, 1975

[54] JOINT ASSEMBLY FOR VERTICALLY ALIGNED SECTIONALIZED MANHOLE STRUCTURES INCORPORATING D-SHAPED GASKETS

[75] Inventor: John Ditcher, Langhorne, Pa.
[73] Assignee: A-Lok Corporation, Trenton, N.J.
[22] Filed: Mar. 20, 1974
[21] Appl. No.: 452,677

[52] U.S. Cl. ........... 277/207; 277/DIG. 2; 285/230; 285/345; 52/396
[51] Int. Cl............................................. F16j 15/10
[58] Field of Search ........ 285/332.5, 230, 231, 345, 285/288; 52/396; 277/206, 207, DIG. 2

[56] References Cited
UNITED STATES PATENTS

| | | | |
|---|---|---|---|
| 2,832,614 | 4/1958 | Settle | 52/396 |
| 2,955,322 | 10/1960 | Hite | 285/288 |
| 3,046,028 | 7/1962 | Nathan | 277/207 A |
| 3,048,415 | 8/1962 | Shook | 277/DIG. 2 |
| 3,058,752 | 10/1962 | Miller | 277/DIG. 2 |
| 3,298,697 | 1/1967 | Ohnstad | 277/DIG. 2 |
| 3,567,233 | 3/1971 | Stepanich | 285/230 |

*Primary Examiner*—Robert I. Smith
*Assistant Examiner*—Robert I. Smith
*Attorney, Agent, or Firm*—Ostrolenk, Faber, Gerb & Soffen

[57] ABSTRACT

Verically aligned manhole sections are assembled by setting one section upon the other whereby cooperating male and female ends are mated to form a watertight joint. The male and female ends are each provided with a diagonally aligned surface adjoining horizontally aligned load bearing surfaces. A shoulder is formed in the diagonally aligned surface of each male end to receive an annular D-shaped gasket mounted therein under tension. The gasket is compressed between the male and female diagonally aligned surfaces so that when one load bearing surface of the upper section is fully bottomed on the cooperating surface of the lower section, the gasket is fully compressed, with the weight of the upper sections serving to aid in compressing the gasket.

13 Claims, 11 Drawing Figures

3,891,224

JOINT ASSEMBLY FOR VERTICALLY ALIGNED SECTIONALIZED MANHOLE STRUCTURES INCORPORATING D-SHAPED GASKETS

The present invention relates to manhole structures and more particularly to watertight joints for vertically installed structures having a novel configuration and employing a novel gasket structure.

BACKGROUND OF THE INVENTION

Sewer systems originally employed manholes which were typically poured-in-place concrete, masonry or brick. Significant cost savings have been obtained through the use of manhole sections precast at a manufacturing site and transported to a job site at which the sections are assembled.

The typical precast concrete manhole comprises a base section, at least one riser section and a top section usually having a grade ring mounted thereon for final and close adjustment of the manhole to the top elevation.

The base, riser and top sections are retained in place by cooperating male and female ends of the interfitted sections cooperatively forming joints which yield a continuous, sturdy and uniform manhole. However, in order to assure watertightness of the assembled manhole, gaskets are normally provided in each joint. In vertically aligned sections it is not possible to place a gasket between the mating load bearing surfaces. Thus, present day sections have been provided with an O-ring gasket which is seated within a groove in the cylindrical surface of a male end and is compressed by the surrounding cylindrical surface. Fabrication of the groove which receives the gasket typically leads to cracking and weakening of the male end significantly reducing, if not destroying, the effectiveness of the watertight seal. Also, the seal does not employ the available gravitational forces to ensure the formation of a joint having a good watertight seal.

BRIEF DESCRIPTION OF THE INVENTION AND OBJECTS

The present invention is characterized by providing a combination of a novel joint structure and a unique D-shaped gasket wherein the joint design avoids the weaknesses of the prior art designs and uses the weight of the sections to full advantage for completely compressing the gasket at the same time that the load bearing surfaces are in full and intimate contact.

The unique shape of the gasket assures full compression of the gasket when the male and female ends are "bottomed" to yield an excellent watertight seal.

It is therefore one object of the present invention to provide a novel joint structure for manhole sections and the like which incorporates a unique D-shaped gasket which assures an excellent watertight seal without affecting the intimate mating of the joined sections.

Still another object of the invention is to utilize to full advantage the weight of the joined sections to fully compress the D-shaped gasket to obtain an excellent watertight seal.

BRIEF DESCRIPTION OF THE FIGURES

The above, as well as other objects of the invention will become apparent when reading the accompanying description and drawings, in which.

DETAILED DESCRIPTION OF THE INVENTION

Figure 1:
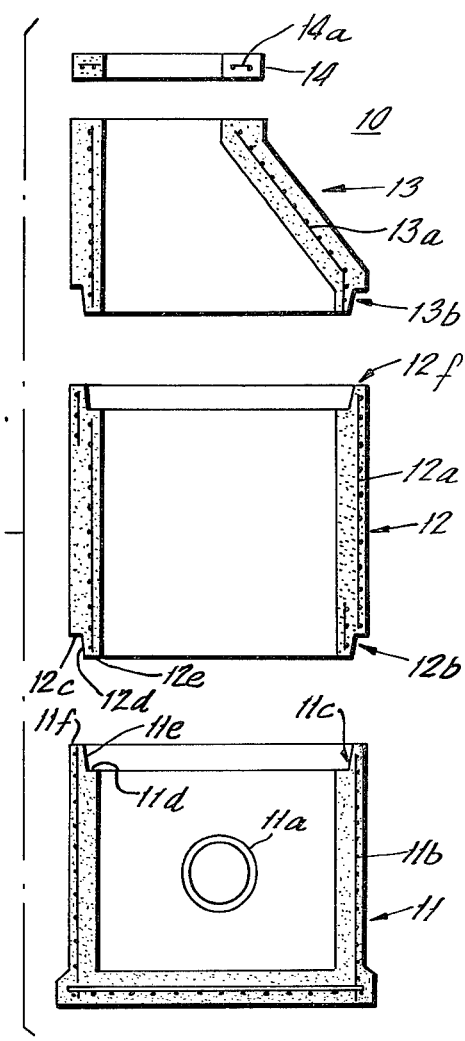
FIG. 1 shows the basic design of a precast concrete manhole.

FIG. 1 shows a sectional view of a basic precast concrete manhole structure 10 comprising a base section 11 at least one riser section 12 and eccentric cone section 13 topped off by a precast grade ring 14. The base section 11 may be comprised of a closed continuous cylindrical side wall or may be a T-section in which openings such as the opening 11a is provided for joining a horizontally aligned pipe thereto. With the exception of the eccentric cone section 13, the base and riser sections are cylindrical in shape.

The number of riser sections employed are typically a function of providing a composite structure having a height adjusted to conform the overall height between the base of the base section 11 and the top elevation. The eccentric cone section 13, which in some cases may also be substituted by a concentric cone section, is utilized to effect the transition from the inside diameter of the riser section 12 to the specified size of the top opening 13c. A cast iron manhole assembly is normally placed on top of the grade ring 14. Riser sections typically have an inner diameter of 48 inches or are available with inner diameters of up to 72 inches and larger. Cylindrical wall thickness is usually of the order of 5 inches. All of the sections 11, 12 and 13 are provided with a steel reenforcing structure of uniform cylindrical contour in the base and riser sections as shown in dotted fashion at 11b and 12a, respectively. The eccentric cone section is shown as having a similar reenforcing structure 13 as is the grade ring which is provided with a reenforcing structure shown at 14a. All sections are formed of concrete cast in molds of the proper shape and then cured.

The sections are firmly joined to one another by means of joints defined by mating male and female ends. For example, FIG. 1 shows the upper end of base section 11 as being provided with a female end 11c having a flat shoulder 11d aligned substantially horizontally and a diagonally aligned interior short wall portion 11e whose diameter is larger than the interior diameter of base section 11, the short wall section 11e extending between shoulder 11d and top edge 11f.

Riser section 12 is provided with a cooperating male end 12b having an exterior horizontally aligned flat shoulder 12c joined to the flat horizontally aligned lower edge 12e by an exterior short wall section 12d. The upper end of riser section 12 is provided with a female end similar to that provided along the top end of base section 11.

The sections are joined by lowering riser section 12 down upon base section 11 until lower edge 12e is firmly seated upon shoulder 11d of the base section 11.

The opposite end of riser section 12 is provided with a female end 12f which is designed substantially similar to the female and 11c of base section 11. The female end may be joined to a cooperating male end 13b of the eccentric cone section 13 or alternatively may be joined to the male end of an additional riser section (not shown for purposes of simplicity).

In casting sections of a precast concrete manhole, the surfaces 12c and 12e and the surfaces 11d and 11f are cast and finished to close tolerances to assure, for example, that the annular shaped flat surface 12e will be in substantially continuous and intimate contact with the mating annular shaped flat surface 11d. Although good intimate contact between cooperating male and female ends of a joint assembly is enhanced by virtue of the fact that the individual sections are quite heavy (for example, a typical riser section 12 of 48 inches diameter and 36 inches height weights over 1,600 lbs.) it is still nevertheless important to finish surfaces 12e and 11b, for example, to close tolerances to assure that the sections of an assembled precast concrete manhole will not rock or vibrate due to earth tremors or any vibrations caused by earth tremors, machinery or vehicular traffic, for example. Thus, not only is it important that the load bearing surfaces of a joint assembly be finished to satisfactory tolerances, but it is also extremely important that no other components be positioned between the mating surfaces 11d and 12e which might affect the desired intimate contact therebetween.

In order to provide a watertight manhole structure, each joint must be provided with a resilient gasket typically formed of rubber which is either extruded or molded and which is cured so as to be substantially free of any imperfections. The rubber gasket is fabricated from a high grade rubber compound of natural rubber, synthetic rubber or a blend of both to assure an extremely long useful operating life since manhole installations are typically expected to provide trouble free service for periods in a range from 40–100 years.

Figure 2:
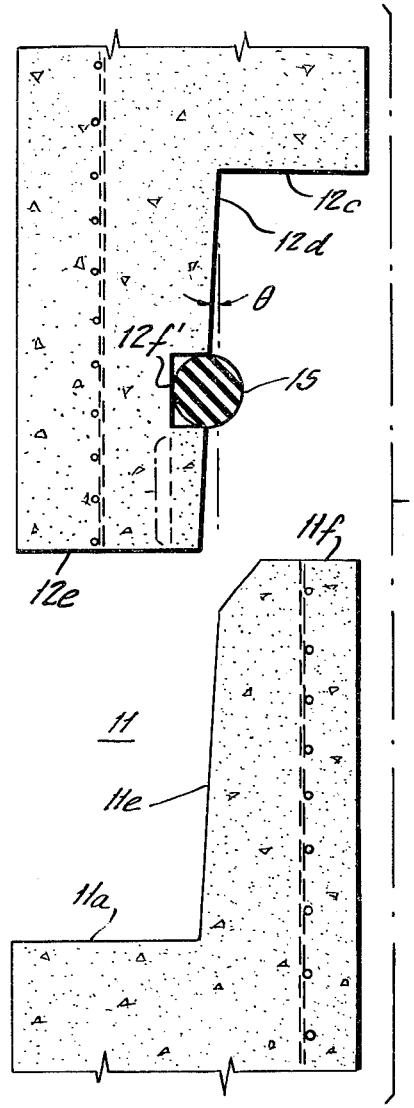
FIGS. 2 and 2a show a detailed view of one joint assembly of the prior art, FIG. 2 showing the male and female ends displaced from one another and FIG. 2a showing an assembled joint.

The gaskets which are conventionally employed to prevent infiltration or exfiltration of liquid are commonly referred to as O-ring gaskets which have an annular shape and a circular cross-section. FIG. 2 shows a detailed view of the male end of riser section 12 and the female end of base section 11 of the prior art wherein the exterior short wall section 12d is provided with an annular groove 12f for receiving and positioning the resilient O-ring gasket 15. It should be understood that groove 12f is a continuous groove completely surrounding short wall section 12d. O-ring 15 is formed of a resilient material which is typically stretched by an amount in the range from 10–20 percent of its original circumference when seated in the groove 12f.

After the gasket 12 is positioned in the manner shown in FIG. 2 and before the male end is joined to a cooperating female end, a lubricating type material such as grease may be spread on the exposed portions of the gasket and on surfaces 12d and 11e to prevent undue frictional engagement between the exposed surface of the O-ring and the short interior wall section 11e.

Figure 2A:
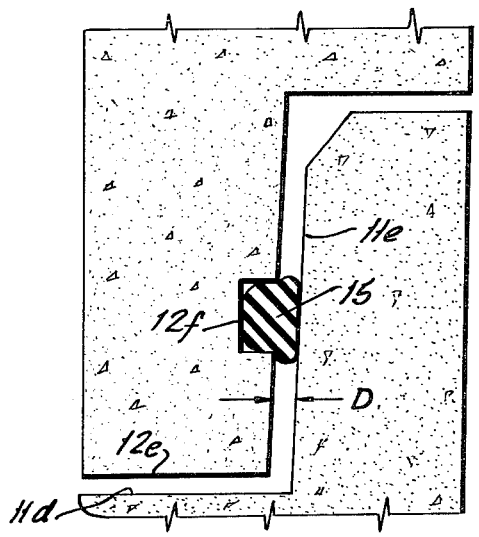

After assembly of the joint is completed, the surface 12e rests upon the surface 11d and the gasket 15 is distorted to a shape substantially as shown in FIG. 2a due to the close spacing between interior surface 11e and groove 12f, it being understood that the normal diameter of the O-ring cross-section is substantially greater than the distance D between the base of groove 12f and surface 11e (see FIG. 2a). The curved surfaces 12d and 11e are typically substantially parallel to one another and their slopes are usually formed in the casting operation so as to deviate from the longitudinal axis of the section by an amount no greater than 2°, this angle being shown as $\theta$.

The prior art design of FIGS. 2 and 2a fails to take advantage of the weight of the sections mounted upon one another to provide a good watertight seal. For example, the watertightness of the seal depends only upon the relative spacing between substantially parallel aligned walls 11e and 12d. If the sections are displaced in the horizontal direction so that the gap between these walls is short along one portion thereof, it is obvious that the gap will be widened at the location which is diametrically opposite thereto making the axial alignment critical from the viewpoint of providing a good watertight seal. Also, in the fabrication of male end 12b, in order to form groove 12f, it is typical to provide a plastic member within the mold, which plastic member is stripped from the annular groove so formed after the cast section has cured. The stripping operation causes chips and breaks in the region of the groove significantly reducing the quality and effectiveness of the seal provided by the gasket. Male ends of sections formed in this manner typically have structural weaknesses in the finished member in the region 16 which has a tendency to be broken away in fabrication, assembly and use.

Figure 3:
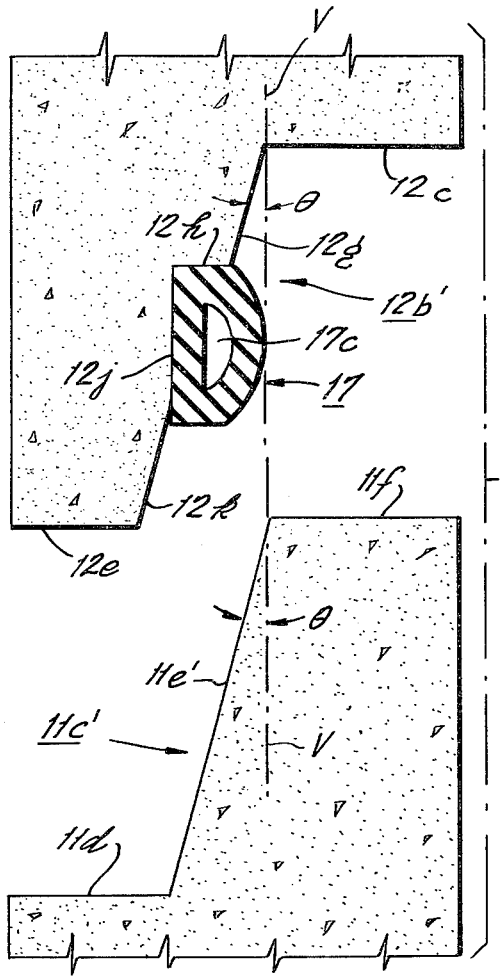
FIGS. 3 and 3a show a joint assemble embodying the principles of the present invention, FIG. 3 showing the male and female ends displaced from one another and FIG. 3a showing the male and female ends in their engaged position and showing the novel gasket in its normal uncompressed state.
Figure 3A:
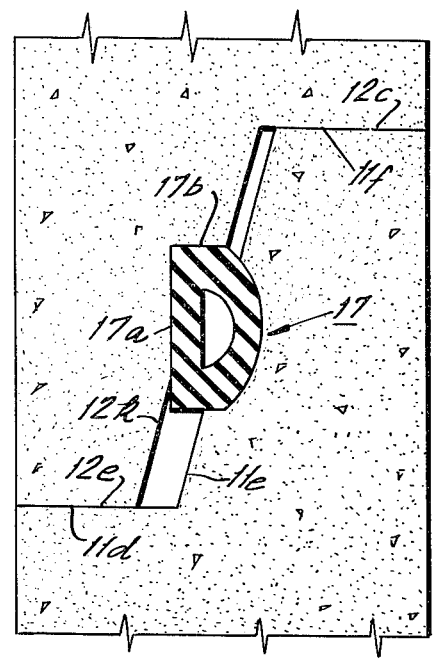
Figure 3B:
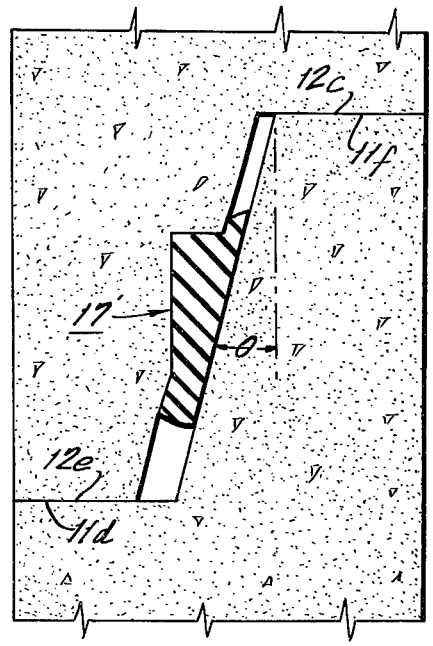
FIG. 3b shows the joint assemble of FIG. 3a with the novel gasket shown in the fully compressed condition.

FIGS. 3–3b show the novel joint and gasket of the instant invention which alleviates the problems attendant the present day design and which provide a structure which takes full advantage of the gravitational forces present to yield an excellent watertight seal.

FIG. 3 shows a modified male end 12b' and a modified female end 11c' which cooperatively form a joint assembly. The female end comprises first and second horizontally aligned flat surfaces 11d and 11f substantially the same as those shown, for example, in FIGS. 2 and 2a with the basic modification of this design being the interior short inner wall section 11e' which forms an angle $\theta$ of the order of 15° with the imaginary vertical axis V.

This modified female end cooperates with the male end 12b' having first and second horizontally aligned flat annular surfaces 12c and 12e which are joined by an exterior inclined surface region comprising first exterior inclined surface portion 12g, a shoulder 12h, a vertically aligned wall section 12j and exterior inclined wall section 12k. Inclined sections 12g and 12k are both inclined at an angle of the order of 15° with the imaginary vertical axis V.

The male end 12b' is designed to seat the novel gasket 17 of the present invention which is a closed loop annular member having a substantially D-shaped cross-sectional configuration, as shown best in FIGS. 3 and 3a. Gasket 17 includes all of the physical characteristics of the O-ring gasket 15 described hereinabove insofar as its constituent materials, elongation characteristics and manufacturing quality are concerned. Alternatively, any of the presently available elastomeric materials approved for such applications may be employed. Gasket 17 is stretched into position so that its interior annular surface 17a rests against wall 12j and so that one of its side walls such as, for example, upper side wall 17b, rests against shoulder 12h. Gasket 17 may be provided with a hollow interior 17c of an adjustable shape and interior volume, to regulate the amount of compression experienced by the gasket, as will be more fully described, or may be solid and homogeneous throughout.

The assembly of a joint similar to that described hereinabove wherein a section such as, for example, a riser section 12 is positioned immediately above a cooperating lower section which may, for example, be a base section 11 is performed whereby the sections are aligned so as to be substantially coaxial with one another. To facilitate the assembly operation, a suitable lubricant such as, for example, a grease, may be placed upon the immediate region of gasket 17, as well as the inclined surface 11e, 12g and 12k adjacent thereto.

Section 21 is lowered until its load bearing surface 12e intimately and substantially continuously mates with load bearing surface 11d. At this time, gasket 17 undergoes compression so as to finally assume the compressed condition 17' shown best in FIG. 3b.

FIG. 3a shows the male and female ends fully assembled and superimposed thereupon shows gasket 17 in its normal uncompressed state so as to better understand the manner and amount of compression which gasket 17 undergoes when the male and female ends are joined.

It can clearly be seen that the design of FIGS. 3–3b take full advantage of the weight of the upper section or sections in serving to compress gasket 17. The component of the gravitational force (i.e., weight) of section 12, as well as other sections mounted thereon, which component is normal, i.e., perpendicular to surface 12k, serves as the component which dictates and controls the compression of gasket 17.

Another significant advantage of the design of FIGS. 3–3b resides in the fact that the nature of gasket 17 is such that full compression is achieved when and only when surfaces 11d and 12e are in good intimate contact with one another. The gasket 17 provides an excellent watertight seal at the joint, while at the same time the intigasket arrangement does not in any way affect the intimate contact between load bearing surfaces 11d and 12e so that the joint, when completed, provides an assembly which will not undergo rocking or otherwise be harmfully affected by local tremors or other vibrations. Shoulder 12h serves as means for urging gasket 17 downwardly under the weight of the section to further assure a good watertight seal.

Another distinct advantage of the novel joint assembly of the present invention over the present day structure resides in the fact that the need for a plastic strip in the mold, which strip is utilized to form the groove 12f of FIG. 2, is eliminated due to the use of the novel notched arrangement defined by the shoulder 12h and cylindrical shaped wall 12j. This arrangement also completely eliminates the formation of any weakened section in the male end such as the section 16 of FIG. 2, as well as simplifying the production of manhole sections.

To assure full compression of the gasket 17, the gasket, while retaining the same cross-sectional configuration of FIGS. 3a and 3b, may be somewhat increased Or enlarged in size or reduced in size to provide for full and complete compression when assembled. One technique for controlling full compression is that of providing a hollow annular interior region 17c, as shown best in FIGS. 3 and 3a. This hollow region is completely eliminated (i.e., fully collapsed) when the gasket undergoes full compression, as shown best in FIG. 3b.

In order to more accurately control the amount and nature of contraction undergone by the gasket, the cross-sectional shape of the gasket interior may be altered in the manner shown in FIGS. 4a – 4e.

Figures 4A, 4B, 4C:
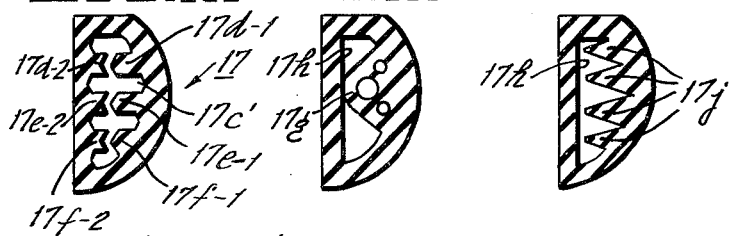
FIGS. 4a–4c show cross sectional views of gaskets embodying the principles of the present invention.
Figures 4D, 4E:
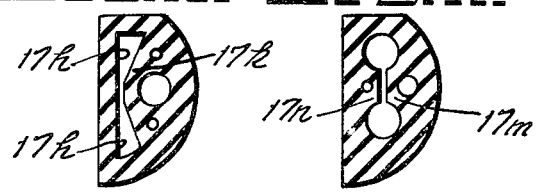

The gaskets of the present invention are normally produced through a continuous extrusion technique. The elongated extruded member is then cut into sets of predetermined length. The ends of a section are then integrally joined typically through a curing or vulcanizing technique. In some cases it is difficult to control the amount of air captured in the hollow interior. Since it is desirable to have the gasket substantially fully collapsed when the joined manhole sections are firmly and intimately joined, better control over the collapsing of the gasket is obtained by shaping the interior cross-section in a manner shown, for example, as is shown in FIGS. 4a in which the gasket 17 has an exterior cross-section similar to that shown in FIG. 3. However, the hollow interior 17c' is provided with a plurality of co-operating pairs of projections 17d–1, 17d–2, 17e–1, 17e–2 and 17f–1, 17f–2. The free ends of projections 17d–1, 17e–1 and 17f–1 have a substantially convex shape while the free ends of projections 17d–2, 17e–2 and 17f–2 have substantially concave shapes which are complementary relative to the free ends of their associated projections. The gasket is positioned in the same manner as shown in FIG. 3. As the mating sections, for example sections 12 and 11 are joined, the gasket is collapsed by the weight of the upper section causing the associated projections to engage one another to facilitate the spreading of the gasket in the manner shown in FIG. 36. The hollow portion of the interior volume can be seen to be significantly less than the shown in FIG. 3.

FIGS. 4b–4e shown other suitable interior cross-sectional shapes which facilitate spreading of the gasket as it collapses. For example note the single tapered projection 17g which engages wall 17h when the gasket collapses. The tapered projections 17j of FIG. 4c likewise engage wall 17h upon contraction. The single tapered projection 17k of FIG. 4d and the plurality of projections of FIG. 4c differ from the single projections 17g of FIG. 4b in that projection 17g has a rounded tip, while projection 17k and the projections 17j have flat truncated free ends. The projections 17m and 17n of FIG. 4e have curved tapers and flat truncated free ends which engage one another when the gasket is compressed.

Although FIGS. 3a and 3b show the mating surfaces 11f and 12c as being in good intimate contact so as to cooperatively provide additional load bearing surfaces together with surfaces 11d and 12e, in another preferred embodiment, surfaces 11f and 12c may be spaced from one another by an amount which, for example, may be of the order of 0.10 inches so as to insure that the mating surfaces 12e and 11d will not be fitted together improperly. However, as an obvious alternative the machined surfaces 12c–12e and 11d–11f may be machined to sufficiently precise tolerances to assure the provision of a pair of mating load bearing survaces 11d–12e and 11f–12c.

Although the arrangement described herein shows the female end of a joint assembly as being positioned beneath the male end, it should be obvious to those with ordinary skill in the art described herein that the male end which is fitted in the same manner shown in FIGS. 3-3b with gasked 17 may be positioned beneath the female end and the female end may be lowered upon the male end in a manner similar to that described hereinabove will all of the other attendant advantageous features of the gasket assembly are preserved. For example, the location of the male and female ends of sections may be reversed without in any way reducing the effectiveness of the assembled watertight manhole structure. Considering FIG. 1, the upper end of base section 11 may be provided with a male end of a design substantially identical to the male end 12b of riser section 12 and containing gasket 17. The riser section positioned theron may then have its female end fitted upon the male end of base section 11.

Although there has been described a preferred embodiment of this novel invention, many variations and modifications will now be apparent to those skilled in the art. Therefore, this invention is to be limited, not by the speicific disclosure herein, but only by the appending claims.

What is claimed is:

1. A watertight joint assembly for cooperating sections of manhole structure;
   a first cylindrical section having a male end;
   a second cylindrical section having a cooperating female end;
   said female end having a flat interior annular load bearing surface spaced inwardly from one end and an inclined interior surface extending between said end and said load bearing surface;
   said male end having an exterior annular shaped surface along the exterior surface of said first section, said surface being spaced inwardly from the adjacent end of said first section;
   said adjacent end of said first section being flat;
   said first section further including an inclined exterior surface extending between said exterior annular surface and said flat end, said inclined surface having an L-shaped notch positioned between said exterior annular surface and said flat end one surface of said notch forming a shoulder;
   a closed-loop resilient gasket having a substantially D-shaped cross-section so that the interior surface of said gasket is substantially straight;
   said gasket being positioned in said notch;
   said gasket being compressed against said female end inclined surface when said fenale end flat interior annular surface and the flat end surface of said male end are in contact thereby cooperating to form the load bearing surfaces of said joint whereby the weight of the upper section urges said sections into engagement and urges said gasket into its compressed state.

2. The assembly of claim 1 wherein the interior surface of said gasket is substantially flat in the axial direction;
   one surface of said notch being flat and substantially parallel to the flat end surface of said male end;
   the remaining surface being substantially parallel to the longitudinal axis of said first section;
   said gasket interior surface engaging said remaining surface of said notch.

3. The assembly of claim 1 wherein the circumference of said notch is greater than the inner circumference of said gasket so that said gasket is at least slightly stretched when positioned in said notch.

4. The assembly of claim 1 herein said gasket is stretched by an amount in the range between 5-25 percent of its normally unstretched circumference when positioned in said notch.

5. The assembly of claim 1 wherein the said gasket has a hollow annular draped interior;
   said hollow interior being completely collapsed when said load bearing surfaces are in intimate contact.

6. The assembly of claim 1 wherein said second section inclined surface is inclined at an angle of the order of 10° to 20° relative to the longitudinal axis of said second section.

7. The assembly of claim 1 wherein said first section inclined surface is inclined at an angle of the order of 10° to 20° relative to the longitudinal axis of said first section.

8. The assembly of claim 1 wherein the inclined surfaces of said first and second sections are substantially parrallel when said male and female ends are in intimate contact.

9. The assembly of claim 1 wherein said first and second sections are axially aligned and said male end rests upon said female end.

10. The assembly of claim 1 wherein said first and second sections are axially aligned and said female end rests upon said male end.

11. The assembly of claim 1 wherein the extreme end of said female end is flat and cooperates with the exterior flat surface of said male end to form a second load bearing surface when said male and female ends are joined together.

12. The assembly of claim 1 wherein the extreme end of said female end is flat and is spaced a predetermined distance from the exterior flat surface of said male end to form a small annular shaped gap when said male and female ends are joined together.

13. A watertight joint assembly for first and second hollow cylindrical sections;
   said first section having a female end;
   said second section having a cooperating male end;
   said female end having an interior inclined wall and a flat interior shoulder extending between said inclined interior wall and the interior surface of said first section;
   said male end having an exterior inclined wall and a flat end surface extending between said exterior inclined wall and the interior surface of said second section;
   the exterior inclined wall of said male end having a continuous annular notch;
   an annular gasket having a substantially D-shaped cross-section positioned in said notch and being compressed against said female end interior inclined wall when said female end flat interior shoulder and said male end flat end surface are in intimate engagement.

* * * * *